US011878512B2

(12) United States Patent
Hochwind et al.

(10) Patent No.: US 11,878,512 B2
(45) Date of Patent: Jan. 23, 2024

(54) METHOD FOR FIXING A PRINT GOOD IN A PRINTING SYSTEM

(71) Applicant: Canon Production Printing Holding B.V., Venlo (NL)

(72) Inventors: Bernhard Hochwind, Munich (DE); Georg Landmesser, Haar (DE); Alfred Zollner, Eitting (DE)

(73) Assignee: Canon Production Printing Holding B.V., Venlo (NL)

( * ) Notice: Subject to any disclaimer, the term of this patent is extended or adjusted under 35 U.S.C. 154(b) by 3 days.

(21) Appl. No.: 17/591,145

(22) Filed: Feb. 2, 2022

(65) Prior Publication Data

US 2022/0242143 A1 Aug. 4, 2022

(30) Foreign Application Priority Data

Feb. 2, 2021 (DE) ........................ 102021102318.1

(51) Int. Cl.
*B41J 11/00* (2006.01)

(52) U.S. Cl.
CPC ................................ *B41J 11/0022* (2021.01)

(58) Field of Classification Search
CPC ............................ B41J 11/0022; B41M 7/009
See application file for complete search history.

(56) References Cited

U.S. PATENT DOCUMENTS

2009/0079784 A1 3/2009 Chiwata et al.
2011/0205282 A1 8/2011 Houjou
2018/0222178 A1* 8/2018 Boland .................. F26B 3/283

FOREIGN PATENT DOCUMENTS

EP 3034309 B1 6/2017

OTHER PUBLICATIONS

German Office Action dated Oct. 13, 2021, Application No. 10 2021 102 318.1.

* cited by examiner

*Primary Examiner* — Bradley W Thies
(74) *Attorney, Agent, or Firm* — The Webb Law Firm

(57) ABSTRACT

In a method for fixing a print good in a printing system, the print good is a substrate printed to with ink, and the print speed of the print good is initially determined. Air heated to a predetermined temperature is then blown onto the print good. The heated air is supplied with a volumetric flow rate that is adjusted depending on the print speed.

18 Claims, 5 Drawing Sheets

METHOD FOR FIXING A PRINT GOOD IN A PRINTING SYSTEM

CROSS REFERENCE TO RELATED APPLICATIONS

This patent application claims priority to German Patent Application No. 102021102318.1, filed Feb. 2, 2021, which is incorporated herein by reference in its entirety.

BACKGROUND

Field

The present disclosure relates to a method for fixing a print good in a printing system.

Related Art

In printing systems, it is typical that, after the ink has been applied onto the substrate, the ink is dried in a drying method. The substrate with the ink printed thereon is called a print good. For drying, in a commonly used method, a jet of hot air is directed toward the print good in a fixing unit of the printing system.

The substrate is the subject matter to be printed to, and is commonly paper, cardboard, or corrugated board.

Different inks may also be used for different printing processes. Given black-and-white printing, different inks are thus used than given a color printing. The ink composition may be chosen specifically for the substrate. The precise ink composition may also be adapted depending on the desired appearance on the substrate.

The drying method must be adapted depending on substrate and ink. The print image must also be dried very differently on a thick 300 $g/m^2$-paper with a surface coating than on newspaper.

Additional factors that influence the drying process are, for example, the temperature of the printing environment, the moisture of the substrate to be printed to, the area coverage of the print, the printing speed, the grammage of the substrate, the ink quantity relative to area etc.

In known drying methods, regulation occurs such that the heat quantity emitted by the fixing unit is modulated by the temperature of the blown air. For example, the temperature of the print good at the end of the heating chamber of the fixing station is brought to a predetermined target value and held by a regulation process. The maximum adjustable power of the fixing unit is thereby designed so that a desired maximum printing speed can be achieved for given paper parameters and printing parameters, wherein the desired fixing effect is just achieved.

Figure 1:
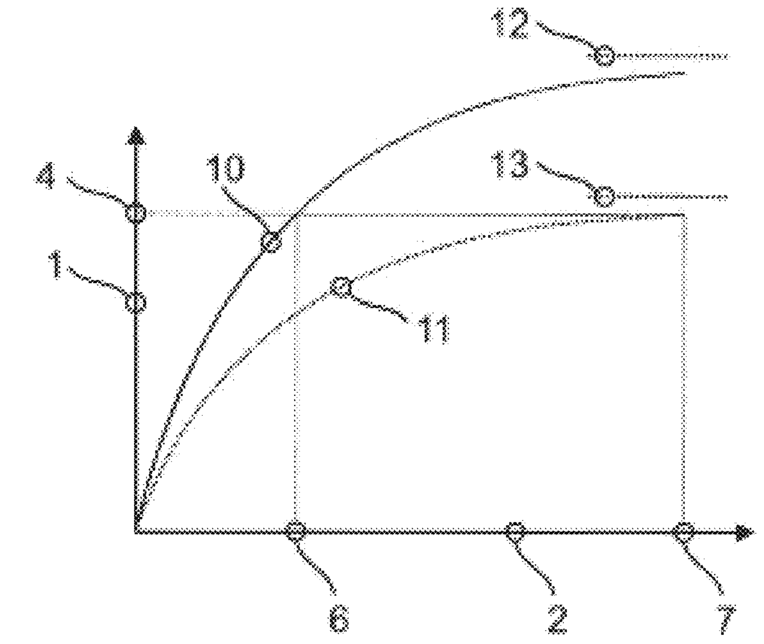
Fig. 1 (related art)
Figure 2:
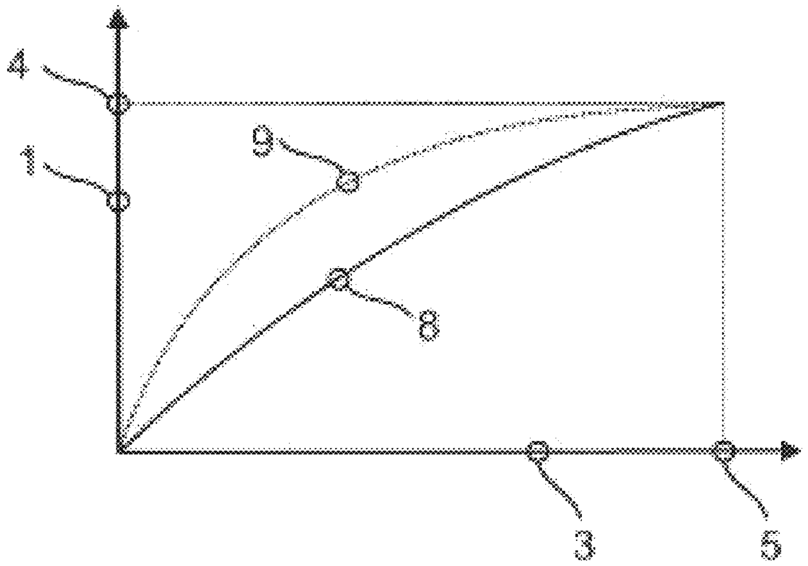
Fig. 2 (related art)

However, it may be that a different temperature curve of the printed substrate during the traversal of the fixing station results at different print speeds (see FIG. 1). In FIG. 2, the temperature 1 is plotted against the position 3 in the fixing station. For example, the initial temperature and end temperature may thus be identical given two different print speeds, but differ in the middle portion (fast print speed 8 and slow print speed 9). The characteristic of the fixing process thereby changes, and therewith among other things the quality of the print product.

FIG. 1 shows a diagram of different temperature curves. The temperature 1 is plotted against time 2. As is visible in FIG. 1, the heating power and therewith the final air temperature 12 is set very high, for example given a high print speed, in order to achieve the corresponding target temperature 4 at the end of the fixing chamber, at the point in time 6. The heating process must take place more rapidly at high print speed, since less time is available than at slower print speed. Given a low print speed, more time is present for heating within the fixing station, and therefore less power is necessary. The final temperature of the air 13 as chosen by the regulator for this purpose will therefore be lower than at high print speed, and therewith will also be less far above the target temperature of the print good 4 than given a fast printing process.

At high print speed, the spatially related temperature curve on the print good thus equates more to a linear rise, wherein it equates more to a root function at a low print speed. At a low print speed, a comparably high level is thus reached relatively quickly, and then persists at this high level. At a low print speed, the print good, which remains longer in the fixing station anyway, is also exposed to a greater proportion of the higher temperature. This affects the drying out of the substrate and the increased evaporation of ink components which have a high boiling point. Both are unwanted effects.

An additional problem is that a plurality of printers may be arranged in series, for example in order to print to the front side and back side of a paper, or to apply different colors. The paper may hereby dry out increasingly more in each individual printing step. The substrate is thus always more humid in the first printer than in the subsequent printers. In spite of identical operating parameters, the temperature curves are accordingly also different, which also negatively affects the uniformity of the fixing quality of the print good.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 1 a diagram of two temperature curves at different print speeds, depending on the position.

FIG. 2 a diagram of two temperature curves at different print speeds, depending on time.

Figure 3:
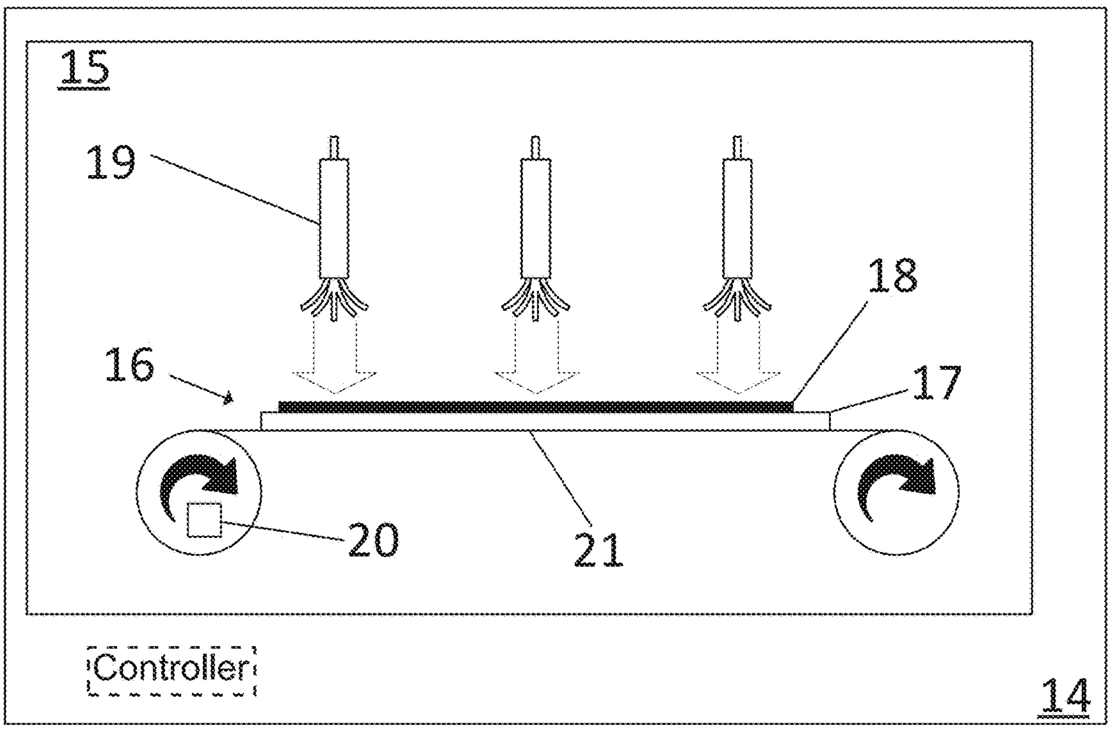

FIG. 3 a fixing unit (fixer) according to an exemplary embodiment.

Figure 4:
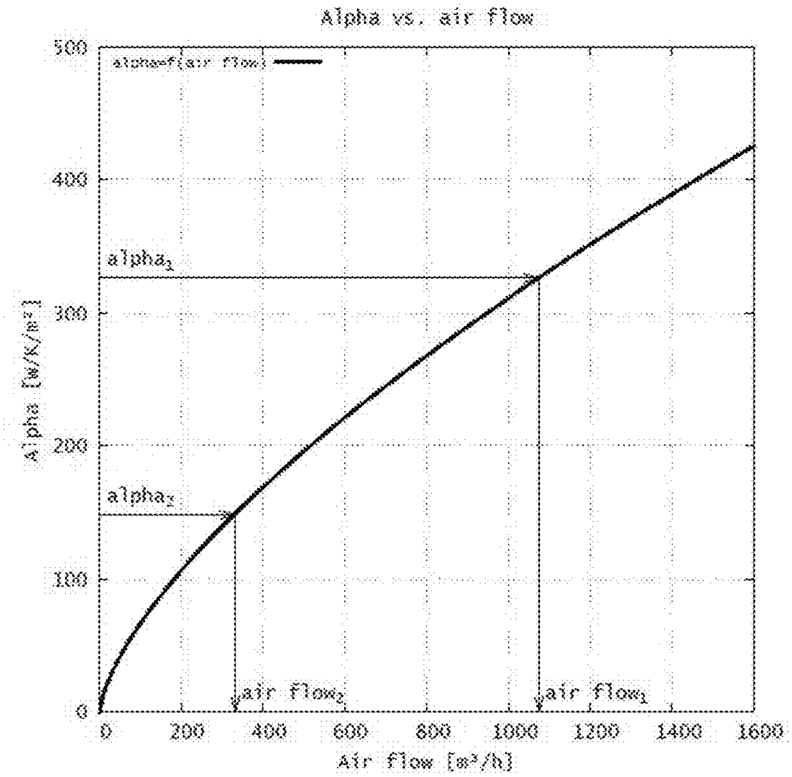

FIG. 4 a diagram of the thermal transfer coefficient of a hot air unit, depending on the volumetric flow rate, according to an exemplary embodiment.

Figure 5:
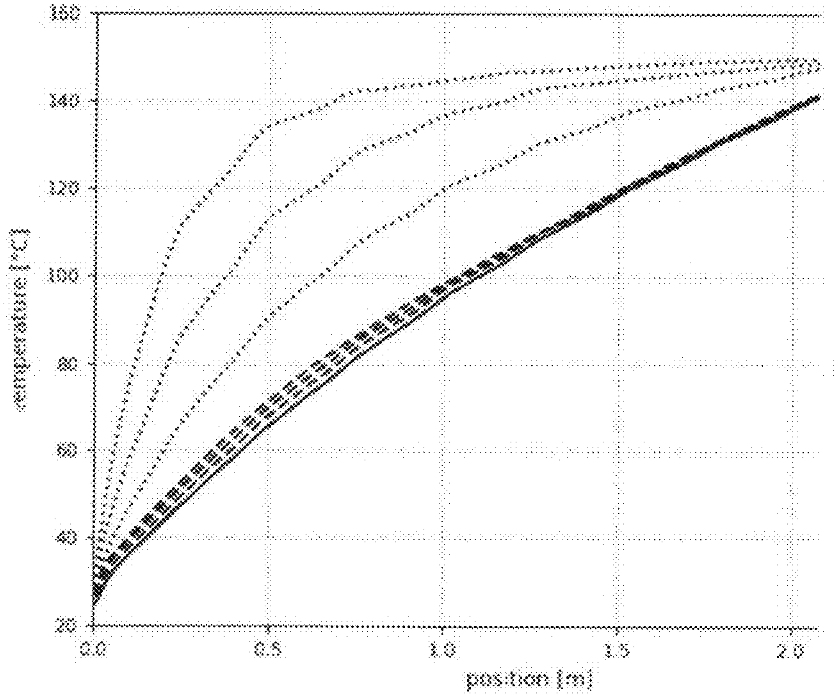

FIG. 5 a diagram of a plurality of temperature curves of different print speeds, depending on the position in the fixing unit, according to an exemplary embodiment.

Figure 6:
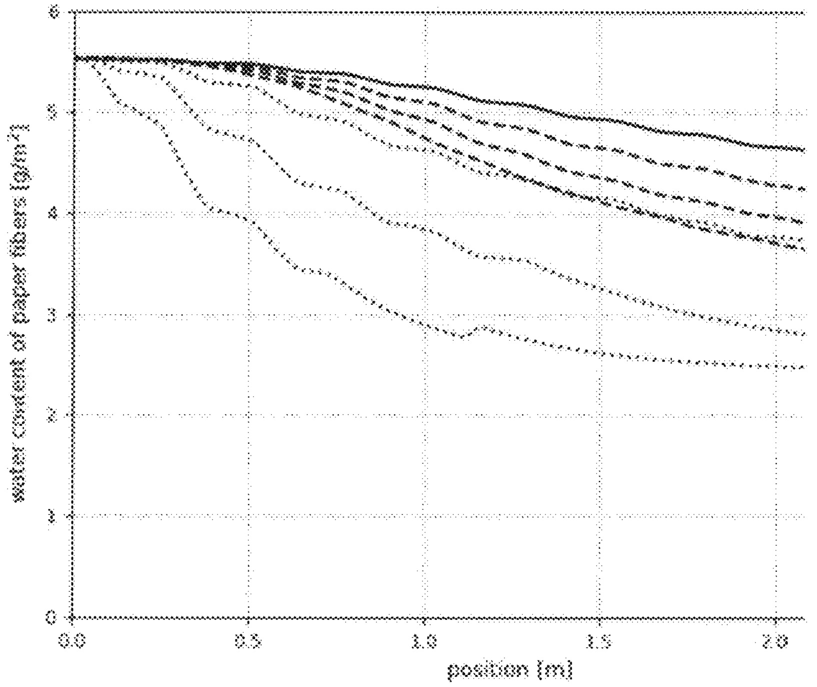

FIG. 6 a diagram of a plurality of moisture curves in the substrate at different print speeds, depending on the position in the fixing unit, according to an exemplary embodiment.

Figure 7:
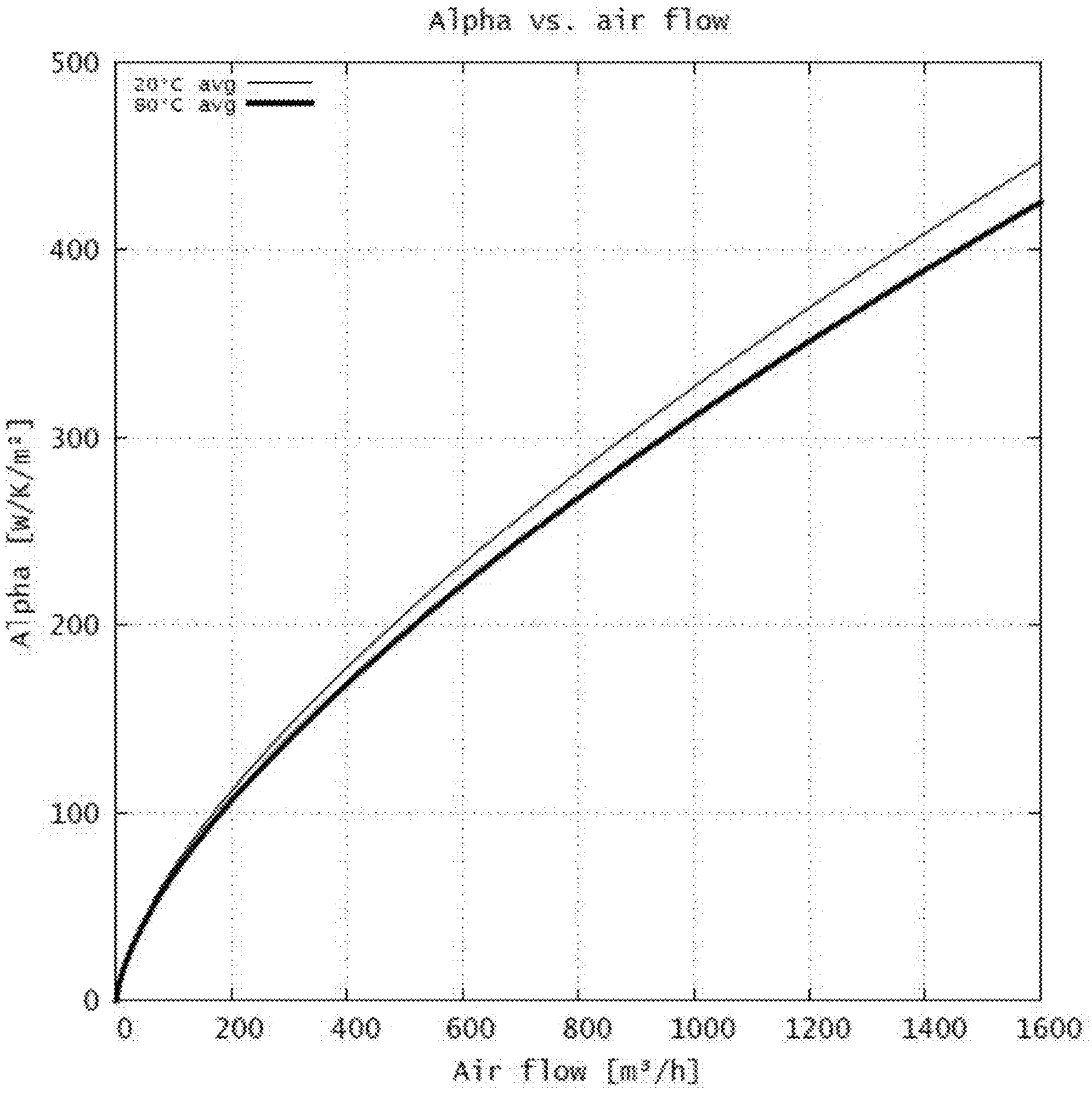

FIG. 7 a diagram with two thermal transfer coefficient curves of different air temperature depending on the volumetric flow rate, according to an exemplary embodiment.

Figure 8:
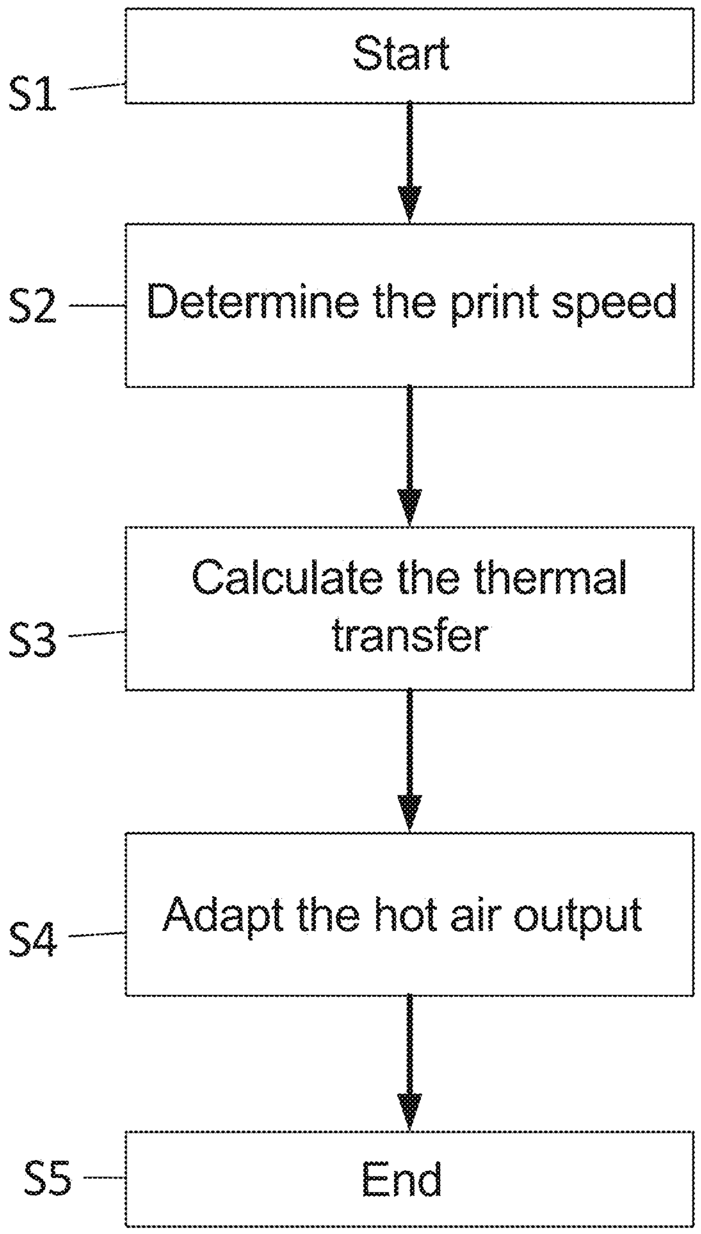

FIG. 8 a flowchart of a method for fixing a print good according to an exemplary embodiment.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

An object of the present disclosure is to provide a method for fixing a print good in a printing system, with which an unwanted drying out of the substrate is prevented.

An additional object is to prevent unwanted evaporation of defined ink components.

Given a method for fixing a print good in a printing system, wherein the print good is a substrate printed to with ink, the print speed of the print good is initially determined. The print speed may thus be provided so that this only needs to be read out from the system. However, it is also conceivable that the print speed is determined/measured by means of a print speed sensor. An air heated to a predetermined temperature is then blown onto the print good. The heated air is supplied with a volumetric flow rate that is adjusted depending on the print speed.

The greater the air flow volume, the greater the heat transmission as well. When a defined temperature at the substrate is reached, and with what speed the substrate and/or the ink is dried, may thus also be adjusted, in addition to the temperature, via the variation of the air flow volume.

The temperature curve in FIG. 5, and the water fraction curve in FIG. 6, are visible in relation to the location in the movement direction of the substrate. The solid lines show the curves of the temperature and of the water fraction at maximum print speed. The dotted lines show the curves at print speeds reduced by a factor of 2, 4, and 8 given down-regulated air temperature, as is typical in the prior art. The dashed lines likewise show print speed reduced by a factor of 2, 4, and 8, but given an adapted volumetric flow rate. It is apparent that the dashed lines are markedly closer to the line with maximum print speed than the dotted lines. The response of the volumetric flow rate controller is linear, and thus can be adapted more easily to the print speeds. The lines of the print speed given volumetric flow rate control are markedly closer to one another than given the method according to the prior art.

If, given fixing of the print good via variation of the volumetric flow rate, the heat transmission of the heated air is set depending on the print speed, it may be effectively prevented that the print good is exposed for too long to a high temperature. Via the lesser dependency of the curve of the temperature on the print speed, it is avoided that portions of the ink that should not be evaporated evaporate, and that the substrate dries out too severely. The quality of the print thereby increases. This has the advantage that the substrate deforms minimally, or in the best case not at all. The temperature curve according to the disclosure increases the robustness of the ink on the substrate with respect to smearing and/or folding.

A thermal transfer coefficient-volumetric flow rate characteristic line of the hot air unit is preferably taken into account in the adjustment of the volumetric flow rate.

The thermal transfer coefficient-volumetric flow rate characteristic line, for example as is visible in FIG. 4, is a measure of how much air must be supplied to the print good in order to bring the print good to a defined temperature.

The thermal transfer coefficient indicates how many watts per Kelvin of temperature difference are transferred between air and substrate per square meter of substrate.

If the thermal transfer coefficient is known, the necessary volumetric flow rate may thus be determined for a given print speed.

Via the method described here, approximately the same print direction-related spatial profile of temperature and moisture always results for the print good within the fixing station, independently of the print speed. In comparison to purely a heating power regulation, at lower print speeds fewer high-boiling volatile components are thereby evaporated from the ink and do not need to be separated from the exhaust air. The components also cannot condense on component parts of the fixing station or on colder regions of the print good.

The thermal transfer coefficient is preferably proportional to the print speed (v).

This may be written as:

$$\alpha=k*v;$$

with the thermal transfer coefficient $\alpha$ and a proportionality constant k. Its unit is thus $W/(m^2\ K)/(m/s)=J/(m^3\ K)$, which corresponds to the unit of the volume-related thermal capacity.

Depicted in FIG. 7 are two thermal transfer coefficient-volumetric flow rate characteristic lines at two different temperatures (20° C. and 80° C.).

As is apparent, these characteristic lines barely differ in spite of the large temperature difference. A consideration of the selected air temperature thus normally does not need to take place.

Optionally, in addition to the print speed, the moisture of the substrate is also determined, and the volumetric flow rate is also adjusted depending on the determined moisture.

The inventors have established that the paper moisture also has an influence on the temperature curve in the fixing unit. A higher paper moisture means that the paper has a higher water fraction. The specific thermal capacity is thereby increased. The temperature rise slows accordingly.

In order to counteract this effect, the thermal transfer coefficient must be increased to the same extent with the moisture-dependent variation of the thermal capacity of the printing substrate.

Via the consideration of the moisture-dependent thermal capacity of the substrate, a marked improvement may be achieved under comparable conditions even given problematic printer installations with a plurality of printers in succession, since the print good then does not dry out as quickly.

The moisture of the substrate is preferably determined proportional to the thickness of the substrate.

The thicker the substrate, the more water that this may take up, and the more moisture is stored. The thermal capacity of the substrate and that of its water content is proportional to its thickness. The absolute moisture, and not the relative or specific moisture of the substrate, is determined as a moisture of the substrate.

The air flow volume of the hot air is preferably varied by varying the infeed pressure, areal density of the nozzles, diameter of the nozzles, and/or number of activated nozzles.

This and the clearance from the substrate are especially simple possibilities for changing the thermal transfer coefficients. These are most often functions that are frequently adjustable via electrical controls. A realization of the method is hereby simply possible.

Noise emission, temporally or spatially non-uniform operation, insufficiently fast control capability, and/or effects on the stability of the paper web will preferably likewise influence the volumetric flow rate as additional factors.

These negative concomitant phenomena may thereby be counteracted. It may be that, given a defined volumetric flow rate and a defined print speed, a resonance forms that generates such negative concomitant phenomena.

A printing system having a fixing unit is designed to execute one of the methods described above.

In an exemplary embodiment, the fixing unit includes nozzles for supplying, to the print good, air regulated to a predetermined temperature.

A heating of the substrate, and thus a temperature regulation, may also take place via other methods than by means of heated air through nozzles, for example by means of infrared and/or in direct contact with heating plates.

A printing system 14 has a fixing unit (fixer) in order to dry a print good 16 (FIG. 3). In an exemplary embodiment, the fixing unit (fixer) 15 is arranged such that it is configured to fix the ink 18 on a substrate 17 after the printing of the substrate 17 with the ink 18 by one or more print heads. The resulting print good includes both the substrate 17 and the ink 18. The printing system 14 may include a transport 21 that moves the substrate 17 through the printing system 14 at a determined velocity (v). The printing system 14 may include a controller that is configured to control the fixing unit 14, control the velocity of the substrate 17, control the printing of the ink 18 onto the substrate 17, control one or more other functions or operations of the printing system 14 and/or is component(s) therein, and/or process data from the print speed sensor 20 and/or other data generated by and/or received by the printing system 14 (and/or one or more of its components). The controller may include one or more processors configured to perform the function(s) of the controller. The controller may additionally include a memory and/or be configured to access an external memory.

In an exemplary embodiment, the fixing unit 15 has a plurality of nozzle cases which may comprise up to multiple hundreds of nozzles.

A predetermined quantity of warm air may be blown onto the print good 16 with a volumetric flow rate via the nozzles which are contained in the nozzle cases 19.

The method for fixing a print good 16 in a printer system 14 according to an exemplary embodiment is explained in the following.

The method begins with step S1 (FIG. 8).

In the next step (S2), the print speed v is determined. What is meant by this is the readout, the actual measurement, and/or calculation. In the present exemplary embodiment, the print speed v is predetermined by the printing system 14 itself and, in this instance, only needs to be read out from the printing system 14. However, it is also conceivable that the print speed is determined by a print speed sensor 20. Alternatively or in combination therewith, it is conceivable that the maximum possible print speed is calculated depending on the substrate that is used and/or ink that is used.

A thermal transfer coefficient $\alpha$ is subsequently determined. The thermal transfer coefficient $\alpha$ indicates what energy quantity should be transferred to the print good. In an exemplary embodiment, the thermal transfer coefficient $\alpha$ is determined by the formula:

$$\alpha=k*v$$

where v is the print speed and k is a proportionality constant.

The proportionality constant k is the same for all print speeds. The matching thermal transfer coefficient $\alpha$ may thus be determined for each print speed v.

The proportionality constant k is determined experimentally or in a computer model. It is hereby determined at an advantageous work point, for example at v=1 m/s. The unit of k is $W/(m^2\ K)/(m/s)=J/(m^3\ K)$, which corresponds to the unit of the volume-related thermal capacity.

Since the proportionality constant k is known in advance, the thermal transfer coefficient $\alpha$ may also be calculated after the print speed v has been determined.

The order of steps S2 and S3 may also be swapped, so that step S3 is executed before step S2.

Step S4 follows, in which that hot air output is adapted. A volumetric flow rate is thereby determined from the thermal transfer coefficient $\alpha$ using a predetermined characteristic operating curve.

Such a characteristic operating curve is apparent in FIG. 4, for example. For example, if a is 150 watts per Kelvin per $m^2$, the corresponding volumetric flow rate ("air flow") is approximately 320 $m^3/h$. This 320 $m^3/h$ is the quantity of air that must be blown onto the print good 16 during the drying process in the given hot air unit for optimal fixing. The nozzle cases 19 of the fixing unit 15 are accordingly adjusted such that a corresponding air quantity is blown onto the print good 16 in the time in which the print good 16 is within the fixing unit 15. The air quantity may also be regulated via connectable nozzles. It is thus conceivable that the openings of the unnecessary nozzles are covered simply by means of a displaceable plate.

The air flow volume of the hot air may be varied by varying the infeed pressure, the clearance from the substrate 17, the areal density of the nozzles, the nozzle diameter, and/or the number of activated nozzles in the nozzle cases 19.

The method ends with step S5.

A further possibility is to also determine the thermal transfer coefficient, in addition to the print speed v, depending on the estimated thermal capacity of the print good 16 C. In this exemplary embodiment, the steps are identical to the aforementioned exemplary embodiment insofar as is not mentioned otherwise.

So that the thermal transfer coefficient $\alpha$ is also dependent on the estimated thermal capacity of the print good 16 C, in this exemplary embodiment the estimated thermal capacity of the printing substrate C is also determined in step S2, in addition to the print speed v.

The thermal capacity of the print good 16 is determined by, among other things, the water fraction of the substrate 17 and the water fraction of the ink 18.

The water fraction of the substrate 17 is influenced by the grammage of the substrate. Expressed in a different way, the selection of the grammage influences the volumetric flow rate of the air through the hot air unit.

The water fraction in the ink 18 is given by the ink quantity and the water fraction relative to the ink 18. The ink quantity is in turn given by the print image, and corresponds to the dispensed ink quantity on the substrate 17. In particular, the ink per total area is thereby not significant; rather, the maximum ink quantity printed on an area element and/or the area element having the highest water content is significant. Furthermore, how large the water fraction is in each ink 18 is known, such that here as well a real water fraction of the ink 18 on the substrate 17 may be determined.

Thus, the volumetric flow rate given a printing with very high water content ink 18 in the region of the area element having the highest water content differs from a printing with less low water ink 18 in the region of the areal element having the highest water content. An area element may thus be a location on the substrate at which a plurality of droplets with the same color and/or with different colors have been printed. In comparison, an area element on the substrate is thus markedly smaller than the total area.

Both the water fraction of the substrate 17 and the ink 18 in the segment to be dried are thus known. The water fraction has the greatest contribution to the thermal capacity.

If the water quantity is known, the thermal capacity of the print good 16 may also be estimated therefrom.

If the thermal transmission is now calculated in step S3, the aforementioned formula changes to $\alpha=k*v*C$. $\alpha$ is dependent not only on the proportionality constant k and the print speed v, but also on the estimated thermal capacity of the print good 16 C.

If the thermal transfer coefficient $\alpha$ has been determined, the corresponding volumetric flow rate may also be determined as in the exemplary embodiment described above in order to thus adjust the air supply.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

REFERENCE LIST

1 temperature
2 time
3 position in the fixing station
4 target temperature
5 temperature measurement position
6 point in time of reaching the desired target temperature at high print speed
7 point in time of reaching the desired target temperature at low print speed
8 temperature curve at high print speed
9 temperature curve at low print speed
10 temperature curve at high print speed
11 temperature curve at low print speed
12 temperature of hot air at high print speed
13 temperature of hot air at low print speed
14 printing system (printer)
15 fixing unit (fixer)
16 print good
17 substrate
18 ink
19 nozzle case (hot air unit)
20 velocity sensor
21 transport
S1 start
S2 determine the print speed
S3 calculate the thermal transmission
S4 adapt the hot air output
S5 end

The invention claimed is:

1. A method for fixing a print good in a printing system, the print good being a substrate printed to with ink, the method comprising:

determining a print speed of the substrate;
heating air to a predetermined temperature;
blowing of the heated air onto the print good, wherein the heated air is supplied with a volumetric flow rate that is adjusted based on the print speed; and
determining a moisture in the ink and/or a moisture of the substrate, wherein the volumetric flow rate is adjusted further based on the determined moisture in the ink and/or the moisture in the substrate.

2. The method according to claim 1, wherein the adjustment of the volumetric flow rate is based on a thermal transfer coefficient-volumetric flow rate characteristic curve.

3. The method according to claim 2, wherein the thermal transfer coefficient is chosen proportional to the print speed.

4. The method according to claim 1, wherein, in the determination of the moisture of the substrate, an absolute water content is assumed to be proportional to a thickness of the substrate.

5. The method according to claim 1, wherein a thermal transfer coefficient of a hot air generator of the printing system is varied by varying an infeed pressure, a clearance from the substrate, an areal density of nozzles of the hot air generator, a diameter of the nozzles of the hot air generator, and/or a number of activated nozzles of the hot air generator.

6. The method according to claim 1, wherein the volumetric flow rate is adjusted further based on a noise emission, temporally or spatially non-uniform operation, insufficiently fast control capability, and/or one or more effects on a stability of the substrate.

7. The method according to claim 6, wherein a variation of one of the noise emission, temporally or spatially non-uniform operation, insufficiently fast control capability, and/or one or more effects on a stability of the substrate produces a smaller change in the volumetric flow rate than a change of the print speed.

8. The method according to claim 1, wherein the volumetric flow rate is determined based on a thermal transfer coefficient.

9. The method according to claim 8, wherein the thermal transfer coefficient is determined based on a proportionality constant and the print speed.

10. The method according to claim 9, wherein the thermal transfer coefficient is further determined based on a thermal capacity of the print good.

11. The method according to claim 10, wherein the thermal capacity of the print good is determined based on a moisture content of in the ink and a moisture content of the substrate.

12. The method according to claim 8, wherein the thermal transfer coefficient is determined based on a product of a proportionality constant and the print speed.

13. The method according to claim 8, wherein proportionality constant is independent of the print speed.

14. The method according to claim 8, wherein the thermal transfer coefficient is determined based on a thermal capacity of the print good.

15. The method according to claim 14, wherein the thermal capacity of the print good is determined based on a moisture content of in the ink and a moisture content of the substrate.

16. A non-transitory computer-readable storage medium with an executable program stored thereon, that when executed, instructs a processor to perform the method of claim 1.

17. A printing system configured to perform the method according to claim 1, the printing system comprising:

a transport configured to transport the substrate at the print speed; and a fixer configured to:

determine the print speed of the substrate;

heat air to the predetermined temperature; and blow the heated air onto the print good, wherein the heated air is supplied with the volumetric flow rate that is adjusted based on the print speed.

18. The printing system according to claim 17, wherein the fixer comprise one or more nozzles configured to supply to the heated air regulated to a predetermined temperature to the print good.

* * * * *